United States Patent [19]

Kelly et al.

[11] Patent Number: 4,602,284
[45] Date of Patent: Jul. 22, 1986

[54] ADAPTER FOR RENDERING A NON-ADDRESSABLE CATV CONVERTER ADDRESSABLE

[75] Inventors: Gordon E. Kelly, Algonquin; Mutsuo Nakanishi, Glen Ellyn, both of Ill.

[73] Assignee: Zenith Electronics Corporation, Glenview, Ill.

[21] Appl. No.: 470,881

[22] Filed: Feb. 28, 1983

[51] Int. Cl.⁴ .................... H04N 7/167; H04N 7/16
[52] U.S. Cl. ................................. 358/122; 358/114; 358/123
[58] Field of Search ............... 358/122, 114, 123; 333/193

[56] References Cited

U.S. PATENT DOCUMENTS

| | | | |
|---|---|---|---|
| 4,296,391 | 10/1981 | Hazama et al. | 333/193 |
| 4,316,220 | 2/1982 | Muterspaugh et al. | 333/193 |
| 4,460,922 | 7/1984 | Ensinger et al. | 358/123 |

Primary Examiner—Stephen C. Buczinski
Assistant Examiner—Linda J. Wallace
Attorney, Agent, or Firm—Cornelius J. O'Connor

[57] ABSTRACT

An STV system commonly transmits scrambled television signals which include encoded data reflecting subscriber address, authorization and program code information. In some STV systems the subscriber installation characteristically comprises a non-addressable converter for converting a transmitted RF signal to an output signal having the frequency of standard VHF television signal. The invention is addressed to an addressable adapter which responds to the output signal of the converter to render the subscriber installation addressable. To this end, the adapter comprises tuning means, data retrieval means and an addressable data processor for deriving, among other information, a decode enable signal. The decode enable signal is instrumental in deriving an unscrambled television signal from the converter output signal.

5 Claims, 4 Drawing Figures

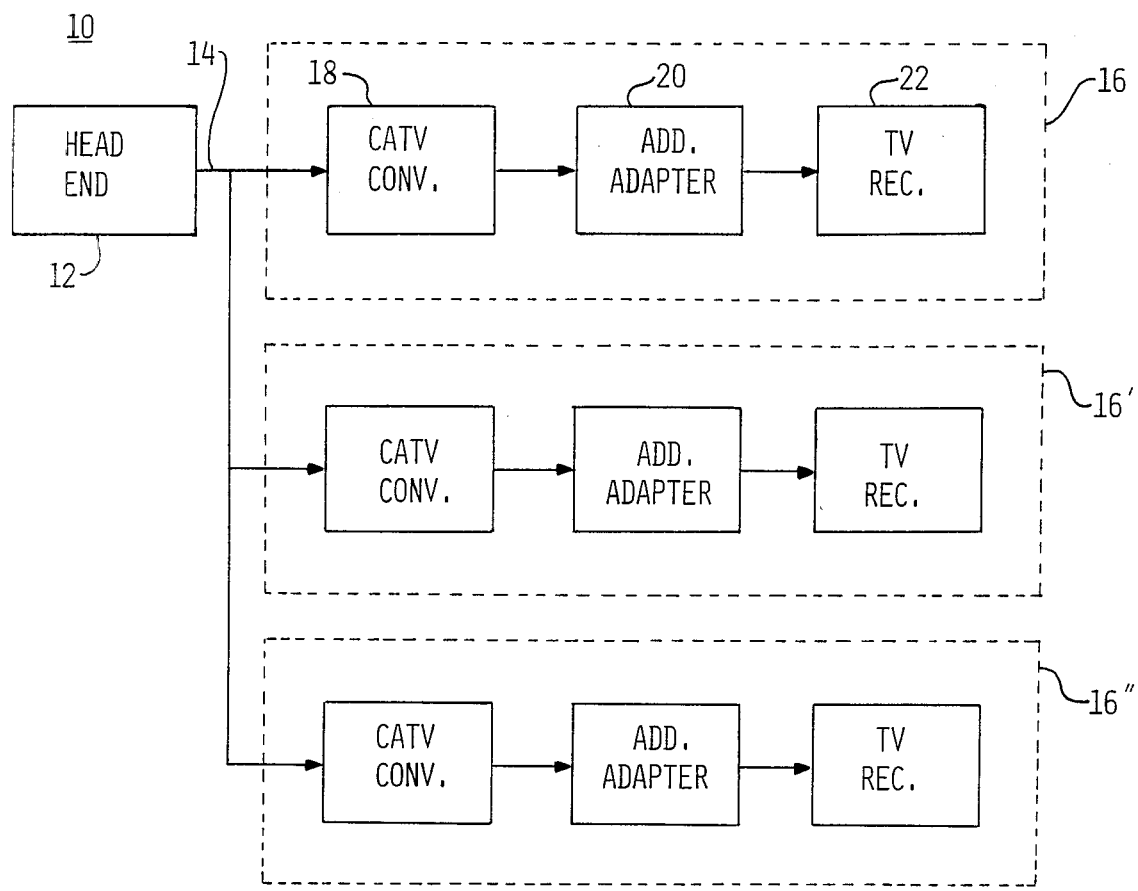
FIG. 1
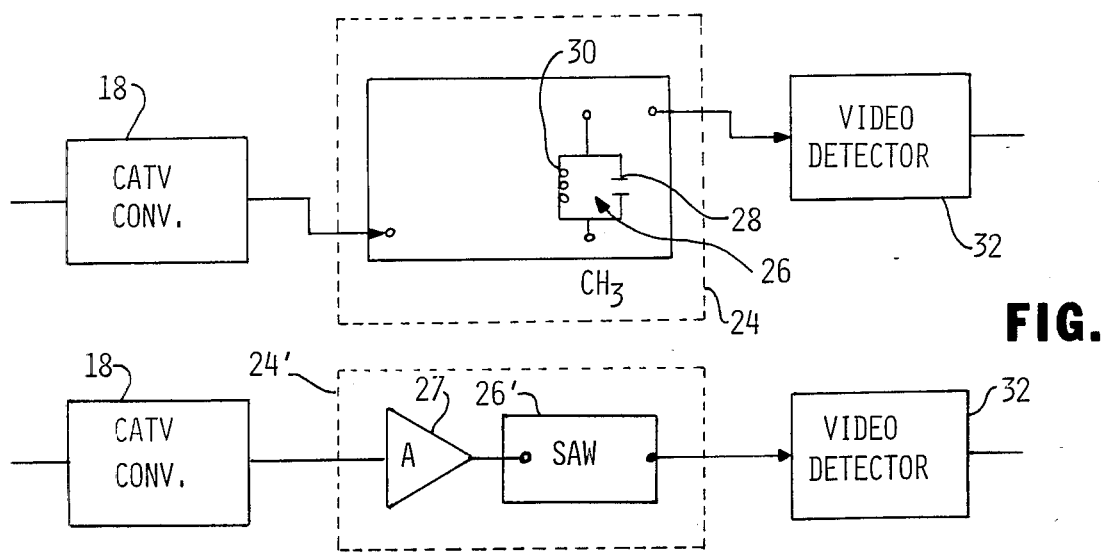
FIG. 3A
FIG. 3B

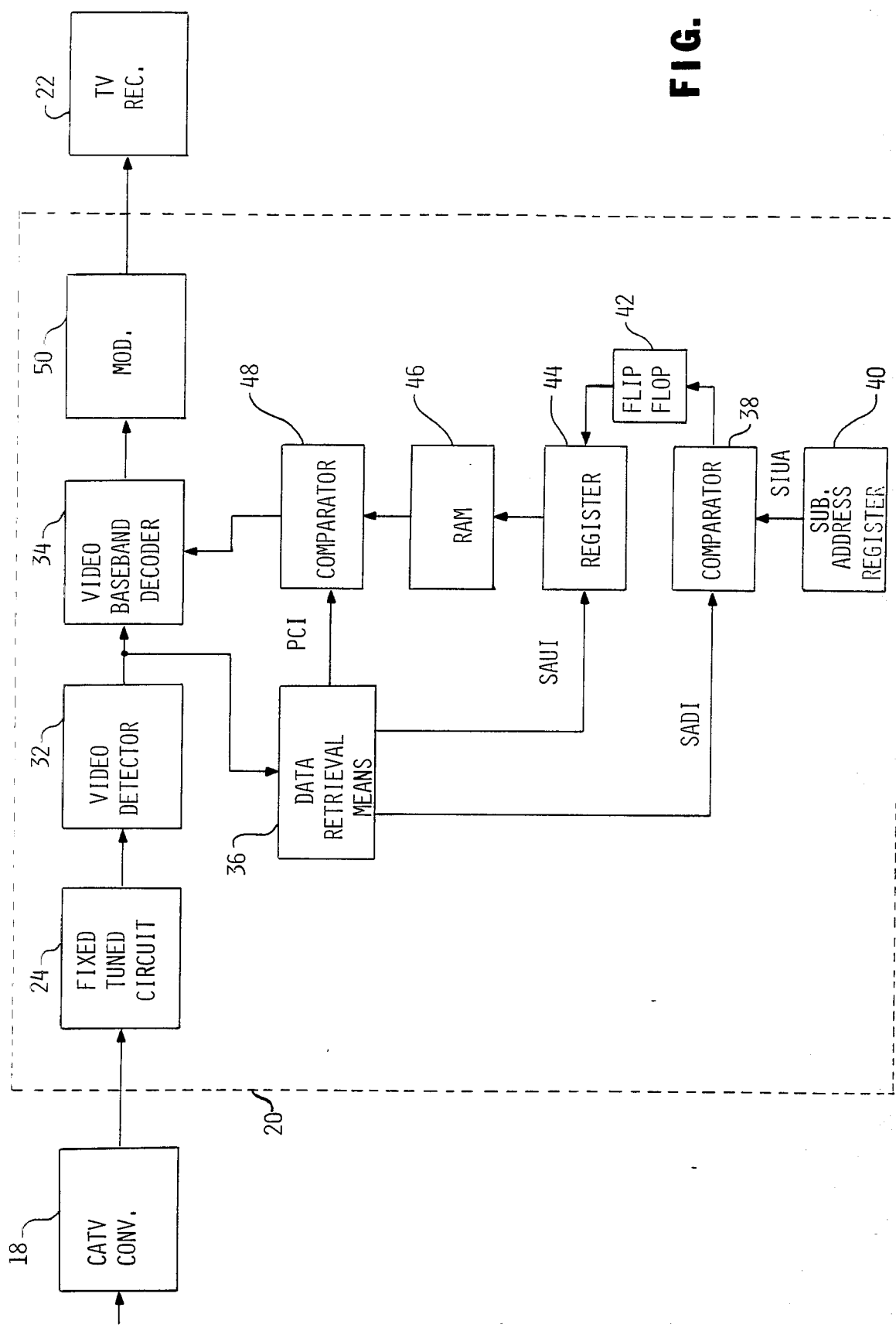

ADAPTER FOR RENDERING A NON-ADDRESSABLE CATV CONVERTER ADDRESSABLE

BACKGROUND OF THE INVENTION

This invention relates in general to subscription television systems (STV) and is particularly concerned with an addressable adapter for use in a cable television system (CATV).

In recent years the STV industry has expanded to an extent that today it furnishes television programming to millions of homes. In a CATV system, a cable serves as a direct link between a subscriber and the cable operator or, "head-end" of the system, that is, the source of the program signals. The cable is terminated, at the subscriber's installation, by a converter which converts the programs the subscriber is authorized to receive to the frequency of a standard VHF television signal (usually channel 3 or, in any event, a channel not already in use in the cable operator's service area), which VHF signal is then coupled to the subscriber's television receiver.

A typical early generation CATV converter, many of which are still in use today, has the subscriber's programming authorization preselected when the converter is initially set up in the subscriber's home. Such authorization preselection is necessitated by virtue of the fact that the cable frequently carries, in the form of video modulated RF carriers, all the programming available from the cable operator, thus each converter serves as a filter to limit the individual subscriber to the programs he is authorized to receive under his contract. Thereafter, should the subscriber wish to change the programming available to him, the cable operator must dispatch a service man to the subscriber's home to make a hands-on alteration of the subscriber's converter or to the trunk feeding that subscriber's cable. Since a programming change cannot be effected from the head-end, but entails a service call, this type of subscriber unit is designated a non-addressable converter.

Another shortcoming of a non-addressable converter is the inability of the cable operator, short of repossessing the converter or disconnecting the feeder cable at a trunk station, to prevent a delinquent subscriber from receiving programs.

Another segment of the STV industry transmits its signal over-the-air, but in a scrambled form so that non-subscribing viewers receive only a scrambled picture. This system also utilizes a converter for its subscribers which serves to unscramble the received signal so that it may be utilized on the subscriber's television receiver. Again, if the converter is non-addressable, the over-the-air system operator faces the same problems encountered by the cable operator. Accordingly, whenever reference is made herein to a "non-addressable CATV converter", it is to be understood that the term also contemplates a non-addressable converter designed to receive air-borne subscription television programs.

Recognizing the limitations of the basic system, a succeeding generation of CATV converters featured addressability, i.e., the ability to respond to command signals, in the form of encoded data, transmitted through the cable network (or, over-the-air) by the head-end. More particularly, in an addressable system each decoder is identified by a unique address so that the head-end can effectively interrogate that subscriber installation and then restrict or expand the programming available to the subscriber to that he is authorized to receive. Moreover, whenever the subscriber wishes to change his programming, he simply calls the head-end to add or delete the program(s) he desires. Since this new information can be instantly inserted into a computer, the subscriber's program authorization can be altered, effectively, at a moment's notice.

Additionally, addressability facilitates subscriber access to pay-per-view (PPV) programming, that is, special services not covered by the fee the subscriber pays for his day-to-day programming. Special services would contemplate championship boxing matches, premium movies, etc., which can be ordered by simply calling the head-end office.

OBJECTS OF THE INVENTION

It is a general object of the invention to render a non-addressable STV converter installation responsive to control signals from the head-end.

It is a specific object of the invention to enable the head-end to restructure a subscriber's programming upon request by the subscriber.

It is also an object of the invention to permit such head-end control of a subscriber's installation as to substantially eliminate service calls to the installation for the purpose of changing pre-existing programming authorization.

It is another specific object of the invention to render a non-addressable STV converter installation amenable to PPV programming upon the subscriber's request.

It is also an object of the invention to afford a STV operator the opportunity to, in effect, instantly terminate service to a deliquent subscriber.

It is still another object of the invention to enable a cable operator to secure addressability for his system without scrapping existing non-addressable converters.

SUMMARY OF THE INVENTION

The invention finds application in a STV system which includes a head-end for transmitting an RF television signal having introduced therein a scrambled television signal. This television signal is characterized by encoded data which reflects subscriber address information, subscriber authorization information and program code information. The system further includes a multitude of non-addressable subscriber installations, each of which includes a broad band converter capable of converting any transmitted RF television signal to an output signal having the frequency of a predetermined standard television channel. The invention specifically contemplates an addressable adapter which responds to the output signal of the converter to render the subscriber installation addressable. The aforesaid adapter comprises tuning means coupled to the output of the converter and fixed-tuned to the predetermined standard VHF signal. Data retrieval means responds to the output of the tuning means to retrieve therefrom, subscriber address information, subscriber authorization information and program code information. An addressable data processing means responds to a verification of the retrieved subscriber address information and the retrieved subscriber authorization information to store the program authorization status for the particular installation. Further, the data processing means, in response to a correspondence between the stored program authorization status and the retrieved program code information, develops a decode enable signal. A decoder means, having an input circuit responsive to the output of the tuning means and responsive to the decode enable signal derives an unscrambled television signal from the converter output signal. Finally, means are provided for applying the unscrambled television signal to the antenna terminals of a television receiver.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 1 is, basically, a block diagram of a non-addressable CATV system, but featuring an adapter for rendering the system addressable;

FIG. 2 is a block diagram of the addressable adapter 20 depicted in FIG. 1; and

FIGS. 3A and 3B illustrate suggested constructions for the fixed tuned circuit portion of the addressable adapter shown in FIG. 2.

DESCRIPTION OF THE PREFERRED EMBODIMENTS

The STV system 10, depicted in block diagram form in FIG. 1, comprises a head-end 12 which constitutes the source of television programming available to a subscriber. In practice, the head-end transmits a multiplicity of RF television signals many of which have a scrambled composite baseband video signal which video signal is characterized by encoded data that reflects subscriber address information, subscriber authorization information and program code information. It is appreciated, of course, that scrambling of the transmitted signal could, alternatively, be effected at the RF level without departing from the spirit of the invention. The aforesaid RF signals are transmitted over a cable 14 (or, over-the-air) to a multitude of subscriber installations 16, 16', 16'', ... Since each subscriber installation is, substantially, a carbon copy of another, only installation 16 will be described. At this juncture, it is to be noted that, while the invention is disclosed as embodied in a cable system, it is appreciated that the crux of the invention, i.e., rendering a non-addressable STV converter addressable, is equally applicable to an over-the-air STV system.

More particularly, installation 16 comprises a non-addressable broadband converter 18, the input of which, in the embodiment herein considered, is coupled to cable 14 (in an over-the-air STV system, the converter would be fed by an antenna). In any event, CATV converter 18 is capable of selecting any of upwards of seventy RF signals carried on the cable and converting the selected signal to an output signal having the frequency of a predetermined standard VHF television channel. In practice, the transmitted cable signal is usually converted to channel 3; however, any VHF channel not already in use in the cable operator's area could be utilized.

In the prior art practice, the output of a non-addressable converter is coupled directly to a television receiver which reproduces transmitted program signals in accordance with the subscriber's preselected programming authorization. By way of contrast, and in accordance with a primary object of the invention, the output of converter 18 is coupled to an addressable adapter 20 which responds to and processes the output RF signal of the converter in such a fashion as to render subscriber installation 16 addressable, all in a manner to be described. The output of adapter 20, in turn, is an unscrambled standard VHF television signal, which is applied to the RF input, or antenna, terminals of a conventional television receiver 22.

Attention is now directed to FIG. 2 which depicts the construction adopted by adapter 20 for rendering subscriber installation 16 addressable. To this end, adapter 20 comprises tuning means 24 which is coupled to the output of converter 18 and which is fixed tuned to a standard VHF television channel, specifically, to the frequency of the predetermined VHF channel to which the converter selected RF signal from the head-end is converted. In one embodiment of the invention actually reduced to practice, tuning means 24 comprises a VHF tuner, the selectivity of which is limited to a single VHF channel. Accordingly, in operation, the selectivity of tuner 24 is restricted to reception of the output signal of the converter at a particular subscriber installation.

A suggested construction for tuner 24, as shown in FIG. 3A, is represented by a fixed tuned circuit 26, which is schematically represented therein. As shown, circuit 26 comprises a capacitor 28 and a coil 30 which are disposed in parallel and fixed-tuned to select VHF channel 3. If desired, or if dictated by circumstances, tuned circuit 26 can be fixed tuned to another VHF channel, for example, channel 2 or 4, by substituting a different coil for component 30. In any event tuner 24 is preconditioned, by one or more such fixed tuned circuits, to respond to the output signal of converter 18 and to convert that output signal to an intermediate frequency (IF) television signal.

In another embodiment of the invention, also reduced to practice, a tuning means 24' comprising a surface acoustic wave filter (SAW) 26', a solid state tuned circuit device, is employed in place of tuned circuit 26, see FIG. 3B. Desirably, an amplifier 27 is interposed between the output of CATV converter 18 and the SAW in order to raise the converter's relatively low voltage output signal to a level sufficient to drive the SAW. In any event, SAW 26' has a fixed-tuned resonant frequency characteristic, which is determined by the physical arrangement of its comb-type electrode array. This comb array establishes the requisite band pass characteristic to permit selection of VHF channel 3 (in the case herein considered) to the exclusion of adjacent channels and other interfering signals. SAW 26' thus regards to the output of converter 18 and couples that RF signal directly to the video detector 32.

In the embodiment of the invention under consideration, the IF output signal from tuner 24, or the VHF RF signal from SAW 26', is coupled to a video detector 32 which demodulates, in one case, the IF signal and, in the other case the RF signal, to derive a scrambled composite baseband video signal. This scrambled video signal is then applied to a baseband video decoder 34, as well as to the input of a data retrieval means 36. Now, in order to render subscriber installation 16 addressable, adapter 20 preferably adopts signal decoding and processing apparatus of the type disclosed in patent application Ser. No. 322,481, now U.S. Pat. No. 4,460,922 which was filed on Nov. 18, 1981 by Ensinger et al and which is to be assigned to the same assignee as the subject invention. To that end, adapter 20 comprises the aforesaid data retrieval means 36 which operates upon the scrambled composite baseband video output signal from detector 32 to retrieve encoded data reflecting the subscriber's address information, the subscriber's authorization information and the program code information. The format of the encoded information, as well as the modus operandi entailed in its retrieval, is described in the reference Ensinger et al application.

Accordingly, to import addressability to subscriber installation 16, the encoded data retrieved from the composite baseband video signal is processed in the following manner. The output of data retrieval means 36 includes, among other output signals, the subscriber's address information (SADI), which is applied to one input terminal of a comparator 38, the subscriber's authorization information (SAUI) and program code information (PCI). A subscriber address register 40 serves to identify installation 16 by storing an address code unique to that installation. Register 40 applies the subscriber installation unique address (SIUA) to a second input terminal of comparator 38. Then, if the SADI signal from data retriever 36 corresponds to the stored SIUA address code, comparator 38 develops an output signal that serves to set a flip flop 42 to a logic high level. When flip flop 42 outputs a logic high, a shift register 44 is enabled to receive and store the associated SAUI signal. The subscriber authorization information SAUI, that is, the programming the installation is authorized to receive, is thereby entered in register 44.

The SAUI code stored in register 44 is written into and stored at a memory location in a RAM 46. Thereafter the stored SAUI signal from RAM 46 is applied to one input of a comparator 48 with the PCI signal outputed from data retriever 36. The program code identifies the accompanying TV program signal.

Upon a correspondence between the SAUI signal stored in RAM 46 and the PCI code signal, a decode enable signal is generated by comparator 48. The video baseband decoder 34 upon receipt of the decode enable signal derives an unscrambled baseband video signal from the scrambled baseband signal received from video detector 32.

The unscrambled baseband video signal is then applied to a modulator 50 which serves to modulate the unscrambled video signal upon a standard VHF television signal carrier and apply that modulated RF signal to the antenna terminals of a television receiver 22.

Accordingly, the described addressable adapter readily permits, at a substantial economy, the rendering of existing non-addressable subscription television installations addressable. As shown, this conversion is effected by applying the output of a non-addressable converter to the input of an adapter 20 and then coupling the output of that adapter to the television receiver's antenna terminals.

Finally, as indicated earlier, if desired, scrambling of the transmitted signal can be effected at the RF level rather than at the composite video level described herein. The particular level at which scrambling takes place is of no moment insofar as the invention, i.e., rendering a non-addressable converter addressable, is concerned.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. For use in a STV system which includes head-end means for transmitting an RF television signal having introduced therein a scrambled television signal characterized by encoded data reflecting subscriber address information, subscriber authorization information, and program code information, the combination comprising:
a multitude of non-addressable subscriber installations each including a broad band converter capable of converting any transmitted RF television signal to an output signal having the frequency of a predetermined standard VHF television channel; and an addressable adapter, responsive to said output signal of said converter for rendering a subscriber installation addressable, comprising;

a fixed tuned circuit coupled to the output of said converter and fixed-tuned to said predetermined standard VHF television channel;

data retrieval means responsive to the output of said fixed tuned circuit for retrieving therefrom said subscriber address information, said subscriber authorization information, and said program code information;

addressable data processing means responsive to a verification of said retrieved subscriber address information and to said retrieved subscriber authorization information for storing program authorization status for said installation, said data processing means further responsive to said stored program authorization status and said derived program code information for developing, upon a correspondence therebetween, a decode enable signal;

decoder means, having an input circuit responsive to the output of said fixed tuned circuit, and responsive to said decode enable signal for deriving an unscrambled television signal from said converter output signal; and means for applying said unscrambled television signal to the RF input terminals of a television receiver.

2. For use in a STV system which includes head-end means for transmitting an RF television signal having introduced therein a scrambled composite baseband video signal characterized by encoded data reflecting subscriber address information, subscriber authorization information, and program code information, the combination comprising:
a multitude of non-addressable subscriber installations each including a broad band converter capable of converting any transmitted RF television signal to an output signal having the frequency of a predetermined standard VHF television channel; and an addressable adapter, responsive to said output signal of said converter for rendering a subscriber information addressable, comprising;

a fixed tuned circuit coupled to the output of said converter and fixed-tuned to said predetermined standard VHF television channel;

video detector means coupled to the output of said fixed tuned circuit for deriving said scrambled composite baseband video signal;

data retrieval means responsive to said derived scrambled composite baseband video signal for retrieving therefrom said subscriber address information, said subscriber authorization information, and said program code information;

addressable data processing means responsive to a verification of said derived subscriber address information and to said derived subscriber authorization information for storing program authorization status for said installation, said data processing means further responsive to said stored program authorization status and said derived program code information for developing, upon a correspondence therebetween, a decode enable signal;

baseband decoder means, having an input circuit coupled to the output of said video detector means, responsive to said decode enable signal for deriving an unscrambled baseband video signal from said demodulated scrambled composite baseband video signal; and RF modulator means for modulating said unscrambled baseband video signal upon a standard VHF television signal carrier for application to the RF input terminals of a television receiver.

3. An addressable adapter as set forth in claim 2 in which said fixed tuned circuit comprises a single channel tuner for converting said converter output signal to an intermediate frequency television signal.

4. An addressable adapter as set forth in claim 2 which said fixed tuned circuit comprises a surface acoustic wave filter.

5. An addressable adapter as set forth in claim 4 which further includes an RF amplifier for coupling the output of said converter to the input of said surface acoustic wave filter.

* * * * *